United States Patent
Kim

(10) Patent No.: US 9,256,242 B2
(45) Date of Patent: Feb. 9, 2016

(54) DRIVER'S INJURY PREVENTION TYPE PEDAL

(71) Applicant: Hyundai Motor Company, Seoul (KR)

(72) Inventor: Eun-Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 14/313,735

(22) Filed: Jun. 24, 2014

(65) Prior Publication Data

US 2015/0168986 A1 Jun. 18, 2015

(30) Foreign Application Priority Data

Dec. 13, 2013 (KR) .......................... 10-2013-0155820

(51) Int. Cl.
*G05G 1/30* (2008.04)
*G05G 1/32* (2008.04)

(52) U.S. Cl.
CPC ...... *G05G 1/30* (2013.01); *G05G 1/32* (2013.01)

(58) Field of Classification Search
CPC ................... Y10T 74/20534; Y10T 74/20585; Y10T 74/20061; Y10T 74/2054; Y10T 74/20528; Y10T 74/20888; G05G 1/323; G05G 1/327
USPC ....................... 74/512–513, 519, 560, 473.16; 180/277, 278, 275
See application file for complete search history.

(56) References Cited

U.S. PATENT DOCUMENTS 6,082,219 A 7/2000 Wolpert
2007/0234841 A1* 10/2007 Tokumo et al. ................. 74/512

FOREIGN PATENT DOCUMENTS

| JP | 5026696 | B2 | 6/2012 |
| JP | 2012-194639 | A | 10/2012 |
| KR | 10-2005-0037741 | A | 4/2005 |
| KR | 10-0534964 | B1 | 12/2005 |
| KR | 10-0805785 | B1 | 2/2008 |
| KR | 10-0986497 | B1 | 10/2010 |
| KR | 10-2012-0062562 | A | 6/2012 |
| KR | 10-2013-0059620 | A | 6/2013 |

* cited by examiner

*Primary Examiner* — Richard W Ridley
*Assistant Examiner* — Yamilka Pinero Medina
(74) *Attorney, Agent, or Firm* — Morgan, Lewis & Bockius LLP

(57) ABSTRACT

A driver's injury prevention type pedal may include a pedal arm which is rotatably coupled, at an upper portion to a pedal arm hinge which acts as a center of rotation of a pedal stroke, and a universal reverse rotation member which reversibly rotates the pedal arm about the pedal arm hinge and away from a driver which may include a mounting bracket to which the upper portion of the pedal arm is fitted and coupled, and a reverse rotation lever which presses the upper portion of the pedal arm by counterclockwise direction rotation formed by pushing of the pedal arm. In particular, the driver's injury prevention type pedal may be converted into a brake pedal, a clutch pedal, or an acceleration pedal, thereby allowing pedal manufacturing costs to be significantly reduced.

13 Claims, 9 Drawing Sheets

DRIVER'S INJURY PREVENTION TYPE PEDAL

CROSS-REFERENCE TO RELATED APPLICATION

This application claims priority to Korean Patent Application No. 10-2013-0155820, filed Dec. 13, 2013, the entire contents of which is incorporated herein by this reference.

BACKGROUND OF THE INVENTION

1. Field of the Invention

The present invention relates to a pedal; and more particularly, to a pedal in which all sorts of pedals may be converted into pedals for preventing driver's injury with no change of design by adopting a universal reverse rotation member for reversely rotating a pedal arm to prevent injury of a driver's leg part.

2. Description of Related Art

In the event of a forward collision of a vehicle, components such as a bumper and an engine are generally pushed rearward due to an impact of the collision to thereby deform an interior structure separated from the engine compartment, resulting in injury to a driver mounted inside the vehicle by the collision.

A driver typically operates a pedal by narrowly keeping a distance between a driver's leg part and the pedal. Accordingly, when the pedal is pushed toward the driver due to deformation of the interior structure, there is a high risk that the driver's leg part is injured by the pushed pedal.

In particular, there is a high risk that a driver's ankle may be injured by a clutch pedal which is always operated by the driver during changing gears and braking, in the event of the collision of the vehicle.

Thus, a pushed amount of the clutch pedal is controlled for satisfying the requirement of EURO-NCAP or Korean-NCAP.

Therefore, the clutch pedal or the brake pedal has an injury prevention function which prevents the injury of the driver's leg part during pushing of the pedal due to the collision, together with securing convenience and reliability of operation thereof.

The brake pedal typically has a reverse rotation type pedal pushing structure. Such a reverse rotation structure is a structure in which, when a lever lock separately fixed to a dash panel moves forward, a transfer rod operatively connected thereto is driven at the rear of a pedal arm such that the pedal arm is reversely rotated to be away from the driver's leg part.

However, since the clutch pedal has a relatively complicated pedal structure compared to the brake pedal, reverse rotation type components applied to the clutch pedal should be structurally modified unlike to those of the brake pedal.

Therefore, since the brake pedal and the clutch pedal may not commonly use the components regardless of having the same reverse rotation type pedal pushing structure, the brake pedal and the clutch pedal may differ from each other. This causes an increase of manufacturing costs.

The information disclosed in this Background of the Invention section is only for enhancement of understanding of the general background of the present invention and should not be construed as an acknowledgment or any form of suggestion that this information forms the prior art already known to a person skilled in the art.

BRIEF SUMMARY

Various aspects of the present invention is directed to a driver's injury prevention type pedal in which a universal reverse rotation member which reversely rotates a pedal arm away from a driver's leg part during a collision is coupled to the pedal arm by a pedal hinge shaft, thereby preventing injury of a driver's leg part caused by pushing of the pedal. In particular, since the driver's injury prevention type pedal is applicable to all sorts of pedals having a pedal arm hinge, the pedal may be converted into a brake pedal, a clutch pedal, or an acceleration pedal for drive's injury prevention, thereby allowing pedal manufacturing costs to be significantly reduced.

In one aspect of the present invention, a pedal may include a pedal arm which is rotatably coupled, at an upper portion to a pedal arm hinge which acts as a center of rotation of a pedal stroke, and a universal reverse rotation member which reversibly rotates the pedal arm about the pedal arm hinge and away from a driver which may include a mounting bracket to which the upper portion of the pedal arm is fitted and coupled, and a reverse rotation lever which presses the upper portion of the pedal arm by counterclockwise direction rotation formed by pushing of the pedal arm.

First and second bushes may be coupled to first and second sides of the pedal arm hinge, respectively.

The pedal arm may be fitted to a side of the mounting bracket in a width and length direction thereof, and a pedal arm coupling portion supporting both first and second sides of the pedal arm hinge may be formed on one side of the mounting bracket. A lever covering portion may protrude from an upper side of the mounting bracket in the width and length direction thereof, and the lever covering portion may be formed at a position where it deviates from a radius of rotation of the reverse rotation lever.

The reverse rotation lever may include a seating body which has bent portions enclosing the first and second sides of the pedal arm hinge, a position body which presses the upper portion of the pedal arm by counterclockwise direction rotation, and a reverse rotation body which receives force in a direction opposite to a pushing direction of the pedal arm such that the counterclockwise direction rotation of the position body is generated.

An overall length section of the seating body may be formed into a step by the bent portions, and each of the bent portions may be rounded to have the same diameter as an outer diameter of the pedal arm hinge.

The reverse rotation body may be bent and extend from a first side end of the seating body, the position body may be formed with a bending portion which is bent and extends from a second side end of the seating body, and the bent direction of the reverse rotation body may be opposed to the bending direction of the position body.

The reverse rotation body may be formed with a foaming protruding from a first side thereof to a second side thereof.

The universal reverse rotation member may further include first and second hinge supporters which are arranged in the mounting bracket in a vertical direction and support first and second sides of the pedal arm hinge below the reverse rotation lever, and a reverse rotation support pin which is arranged in the mounting bracket in a horizontal direction above the reverse rotation lever.

The first and second hinge supporters may be respectively formed with bent portions enclosing the first and second sides of the pedal arm hinge, overall length sections of the first and second hinge supporters may be respectively formed into a step by the bent portions, and each of the bent portions may be rounded to have the same diameter as an outer diameter of the pedal arm hinge.

The first and second hinge supporters may be respectively provided with first and second protrusions, and the first and second protrusions of the first hinge supporter and the first and second protrusions of the second hinge supporter may form the reverse rotation lever and riveting fixing portions, respectively.

Force for rotating the reverse rotation lever in a counter-clockwise direction may be applied by a cowl mounting bracket coupled to a cowl cross bar, and the pedal arm may rotate about a push rod of a booster in an opposite clockwise direction so that a lower portion of the pedal arm is rotated away from a driver. The cowl mounting bracket may be provided with a lever stopper directed toward the reverse rotation lever.

In another aspect of the present invention, a pedal may include a pedal arm which is coupled, at an upper portion thereof, to a pedal arm hinge as a center of rotation of a pedal stroke, and a universal reverse rotation member which may include a mounting bracket fixedly coupled to a vehicle body in a state in which the upper portion of the pedal arm is fitted and coupled to the mounting bracket so as to support the pedal arm hinge, first and second hinge supporters which are vertically fixed to the mounting bracket and respectively formed with round-shaped bent portions enclosing left and right sides of the pedal arm hinge, a reverse rotation lever which is formed with round-shaped bent portions enclosing left and right sides of the pedal arm hinge and applies reverse rotation by pressing the upper portion of the pedal arm such that the pedal arm is away from a driver, and a reverse rotation support pin which is horizontally fixed to the mounting bracket and reinforces horizontal strength of the mounting bracket.

Reverse rotation type components for preventing injury of a driver's leg part are applicable to all sorts of pedals. By only a change of a pedal arm, the components may be commonly used for all vehicles even when specifications for vehicles differ from each other. Therefore, it may be possible to reduce investment costs and production costs by common use in all vehicles. A reverse rotation type device for preventing injury of the driver's leg part uses a welding or riveting structure instead of a structure in which a pedal member is torn and released, therefore it may be possible to easily adjust a collision.

Furthermore, the reverse rotation type device for preventing injury of the driver's leg part applies riveting or welding, bending, curvature, and load support with respect to rotation components, therefore it may be possible to significantly increase pedal strength. In addition to these advantages, since rotation of the reverse rotation type device for preventing injury of the driver's leg part is generated only under collision conditions, it may be possible to securely prevent injury of the driver's leg part during the collision and safely drive the vehicle in the normal operating mode afterwards.

Moreover, reverse rotation type devices for preventing injury of the driver's leg part are not affected by a vehicle layout, therefore the device is applicable to an vehicles in which a retreat prevention bracket for preventing injury of the driver's leg part is applied and has convenient assembly and A/S work. The reverse rotation type device for preventing injury of the driver's leg part has lower manufacturing costs and is applicable to a brake pedal and/or a clutch pedal, therefore it may be possible to reduce manufacturing costs of the brake and/or clutch pedal and significantly increase competitive strength of the brake and/or clutch pedal product.

It is understood that the term "vehicle" or "vehicular" or other similar term as used herein is inclusive of motor vehicles in general such as passenger automobiles including sports utility vehicles (SUVs), busses, trucks, various commercial vehicles, watercraft including a variety of boats and ships, aircraft, and the like, and includes hybrid vehicles, alternative fuel vehicles, (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description which together serve to explain certain principles of the present invention.

Figure 1:
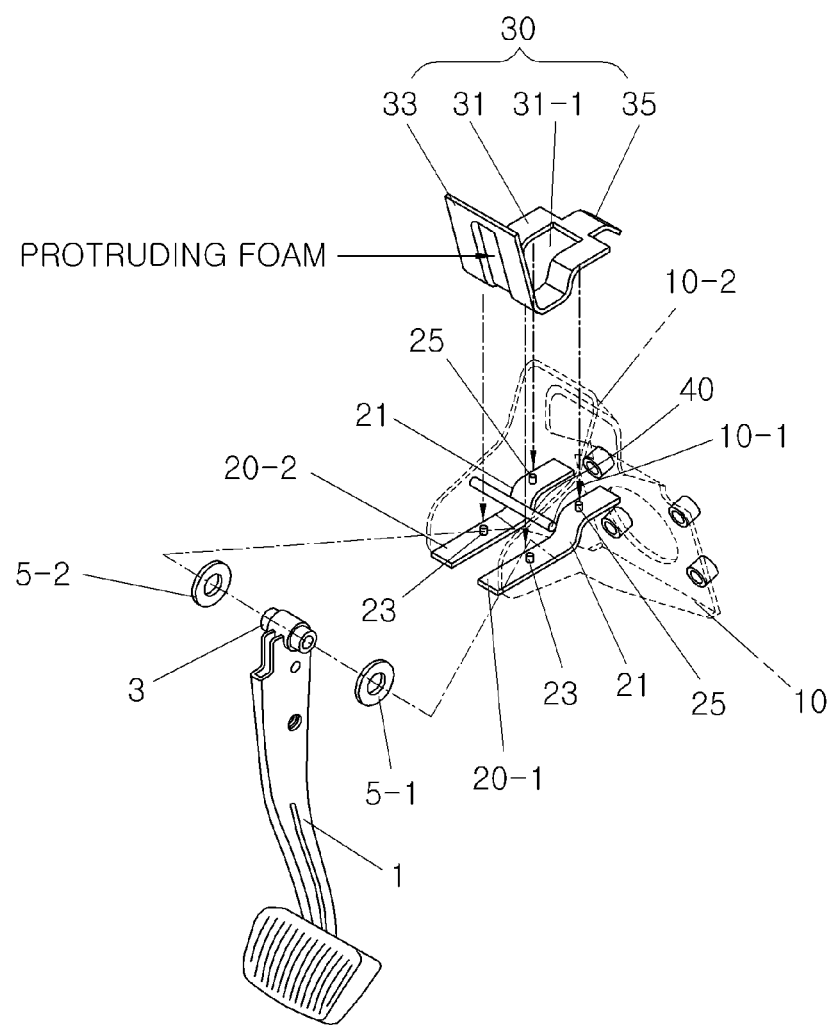
FIG. 1 is an exploded view illustrating a configuration of a driver's injury prevention type pedal according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present disclosure, examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

FIG. 1 is an exploded view illustrating a universal reverse configuration for a driver's injury prevention type pedal according to an exemplary embodiment of the present invention.

As shown in FIG. 1, the driver's injury prevention type pedal may include a pedal arm 1 which is rotatably coupled at an upper portion to a pedal arm hinge 3 which acts as a center of rotation of a pedal stroke. It may also include a universal reverse rotation member which reversibly rotates the pedal arm 1 pushed towards a driver's leg part during forward collision by rotating the pedal arm 1 about the pedal arm hinge 3 so that the pedal arm 1 is rotated away from a driver.

The pedal arm 1 may further include a pedal plate stepped on by a driver's foot, and a pedal ratio is defined by the pedal arm 1 which pivotally rotates about the pedal arm hinge 3.

The universal reverse rotation member is coupled to the pedal arm hinge 3 by a first bushing 5-1 fitted and coupled to a first side of the pedal arm hinge and a second bushing 5-2 fitted and coupled to a second side of the pedal arm hinge 3. Therefore, the universal reverse rotation member may be coupled to any or all of a brake pedal arm, an acceleration pedal arm, and a clutch pedal arm having the pedal arm hinge 3.

The universal reverse rotation member may include a mounting bracket 10, a pair of hinge supporters 20-1 and 20-2, a reverse rotation lever 30, and a reverse rotation support pin 40. The mounting bracket 10 is fixed to a vehicle body in a state of being coupled to the pedal arm 1 by the pedal arm hinge 3.

Figure 5A:
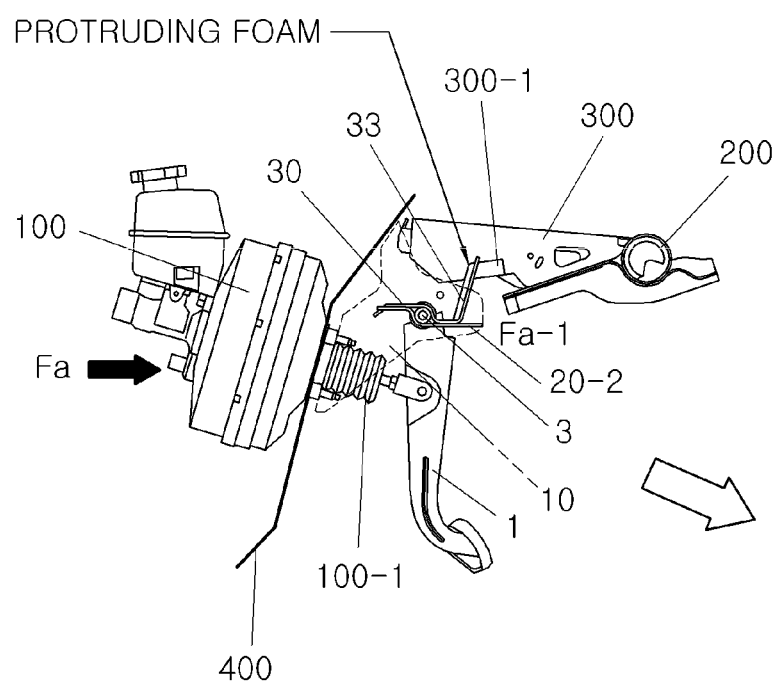
FIG. 5A is a view illustrating an initial operation state of the driver's injury prevention type pedal for preventing injury to the driver's leg part according to an exemplary embodiment of the present invention.

In an aspect of the present invention, a pedal arm coupling portion 10-1 supporting both a first and a second side of the pedal arm hinge 3 is formed at a side of the mounting bracket 10 in a width and length direction thereof in a state in which the pedal arm 1 is coupled to the mounting bracket 10 is formed at a side of the mounting bracket 10 in a width and length direction thereof. The opposite side of the mounting bracket 10, which is not formed with the pedal arm coupling portion 10-1, has one or more dampers coupled to it. The one or more dampers are pressed against a dash panel 400 (as shown in FIG. 5A).

A lever covering portion 10-2 protrudes from an upper side of the mounting bracket 10 in the width and length direction thereof. The lever covering portion 10-2 may be configured such that the mounting bracket 10 has an increased size in width cross-section at a position in which the lever covering portion 10-2 deviates from a radius of rotation of the reverse rotation lever 30.

The hinge supporters 20-1 and 20-2 are constructed such that a first hinge supporter 20-1 is arranged in a vertical direction from a first side of the pedal arm coupling portion 10-1 of the mounting bracket 10 and a second hinge supporter 20-2 arranged in a vertical direction from a second side thereof. The first and second hinge supporters 20-1 and 20-2 are fixedly coupled to the mounting bracket 10 in the vertical direction by welding, riveting or any other similar method. The first and second hinge supporters 20-1 and 20-2 may have the same shape.

For example, the first hinge supporter 20-1 may be formed with a bent portion 21 at some point along the length thereof, and is configured such that a proximal section of the first hinge supporter 20-1 and a distal section thereof are formed into a step relative to each other on the basis of the bent portion 21. In particular, the bent portion 21 is rounded to the same diameter as an outer diameter of the pedal arm hinge 3 such that the pedal arm hinge 3 of the pedal arm 1 may be stably positioned on the first hinge supporter.

In addition, the proximal section of the first hinge supporter 20-1 on the basis of the bent portion 21 is formed with a first rivet protrusion 23 and the distal section thereof is formed with a second rivet protrusion 25. The first and second rivet protrusions 23 and 25 form a riveting fixing portion for fixedly coupling the reverse rotation lever 30. The second hinge supporter 20-2 is formed with a bent portion 21 and first and second protrusions 23 and 25. Thus, the second hinge supporter 20-2 has the same structure as the first hinge supporter 20-1.

In another aspect of the present invention, the reverse rotation lever 30 applies reverse rotation to the pedal arm 1 by pressing an upper portion of the pedal arm 1 moved along with pedal pushing due to a force for example a collision so that the pedal arm 1 is rotated away from a driver.

The reverse rotation lever 30 may be formed with bent portions 31a (shown in FIG. 3B) such that a proximal section of the reverse rotation lever 30 and a distal section thereof are formed into a step relative to each other. The reverse rotation lever 30 may include a seating body 31 having a perforated opening portion 31-1, a reverse rotation body 33 bent upward of the seating body 31 from a first side end of the seating body 31, and a position body 35 extending to form a bending portion bent downward of the seating body 31 from the a second side end of the seating body 31. The round shape of each of the bent portions 31a has the same diameter as the outer diameter of the pedal arm hinge 3.

The seating body 31 may be fixedly coupled to the first and second hinge supporters 20-1 and 20-2. In particular, the seating body 31 may be formed with four riveting fixing portions by means of using the first and second rivet protrusions 23 and 25 of the first hinge supporter 20-1 and the first and second rivet protrusions 23 and 25 of the second hinge supporter 20-2. Thus, the reverse rotation lever 30 may be operated only to the extent that the four riveting fixing portions are broken.

The upper portion of the pedal arm 1 to which the pedal arm hinge 3 is rotatably coupled is located within the opening portion 31-1 of the seating body 31, and the first and second sides of the pedal arm hinge 3 are respectively located between the bent portions 31a. Thus, the left and right parts of the pedal arm hinge 3 are supported by the bent portions 31a of the reverse rotation lever 30 and the bent portions 21 of the first and second hinge supporters 20-1 and 20-2, so that the pedal arm hinge 3 may be prevented from moving under any circumstances.

The reverse rotation body 33 is formed with foam protruding from a first side of the reverse rotation body 33 to a second side thereof, and the foam has a size adapted for required strength of the reverse rotation body 33.

The position body 35 has a width size equal to the distance of a space defined between the first and second hinge supporters 20-1 and 20-2. Thus, the bending portion of the position body 35 is fixed in the space defined between the first and second hinge supporters 20-1 and 20-2, with the result that the reverse rotation lever 30 is prevented from moving in the left and right directions and is lowered toward the pedal arm 1, particularly during the collision, such that the pedal arm 1 may be reversely rotated.

In other aspects of the present invention, the reverse rotation support pin 40 is fixed to the mounting bracket 10 in a horizontal direction thereof so as to reinforce horizontal strength of the mounting bracket 10. The reverse rotation support pin 40 is fixed to the mounting bracket 10 by welding or riveting or any other method of fixed coupling.

When the hinge portion of the pedal arm 1 is changed due to a difference in a vehicle layout to which the pedal is applied, the universal reverse rotation member properly changes the structure of the pedal arm 1 and the reverse rotation lever 30. In addition, since the pair of hinge supporters 20-1 and 20-2 and the reverse rotation support pin 40 are applied with no change of design or no change and addition of assembly process when only a position fixed to the mounting bracket 10 is changed, the components may be commonly used.

Figure 2:
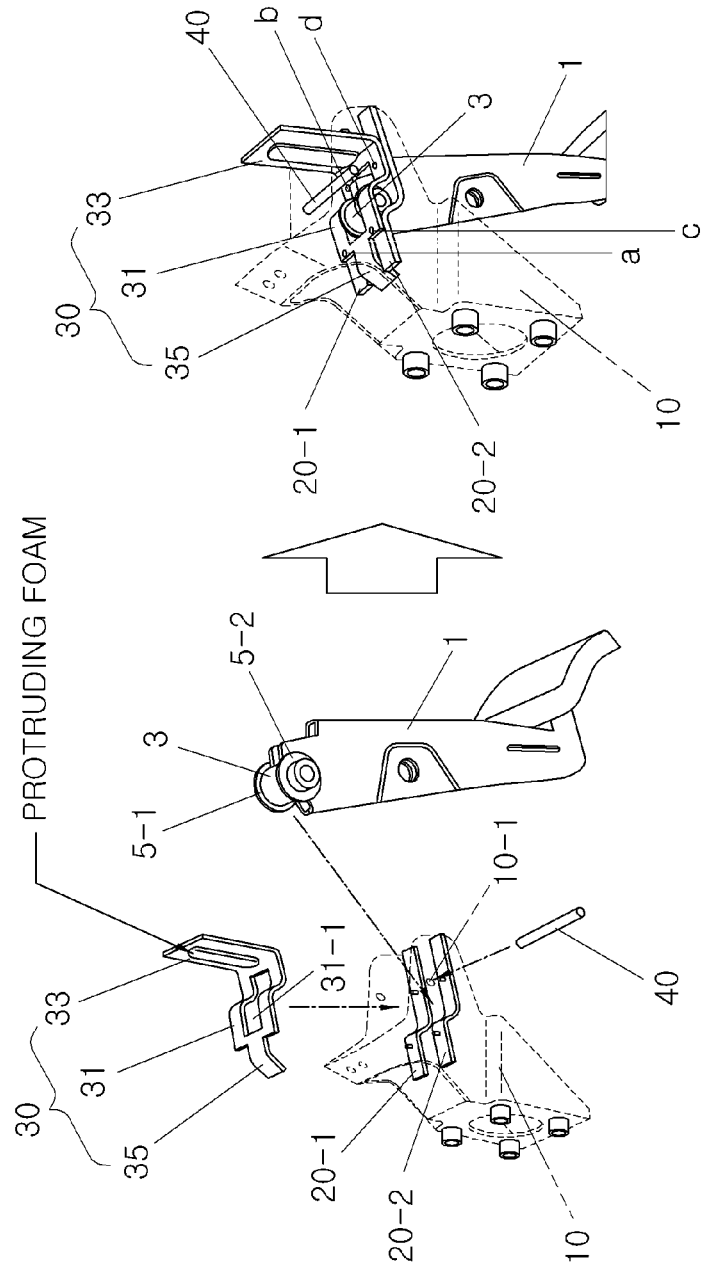
FIG. 2 is a view illustrating an assembly sequence of the driver's injury prevention type pedal according to an exemplary embodiment of the present invention.
Figure 3A:
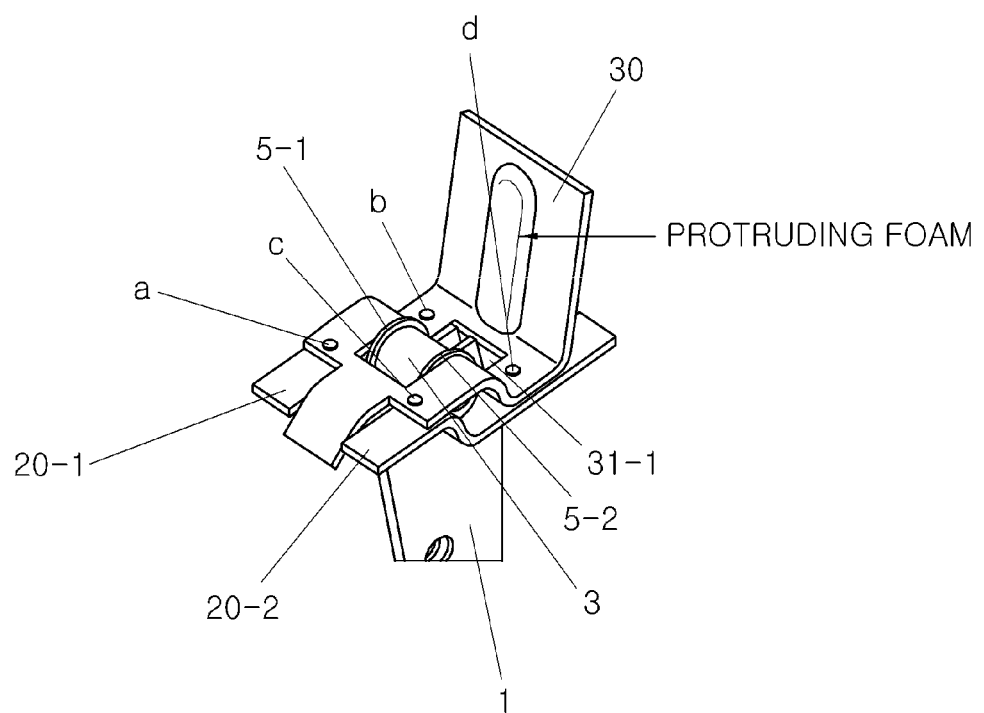
FIG. 3A is a view illustrating a first portion of an assembly of the driver's injury prevention type pedal according to an exemplary embodiment of the present invention.
Figure 3B:
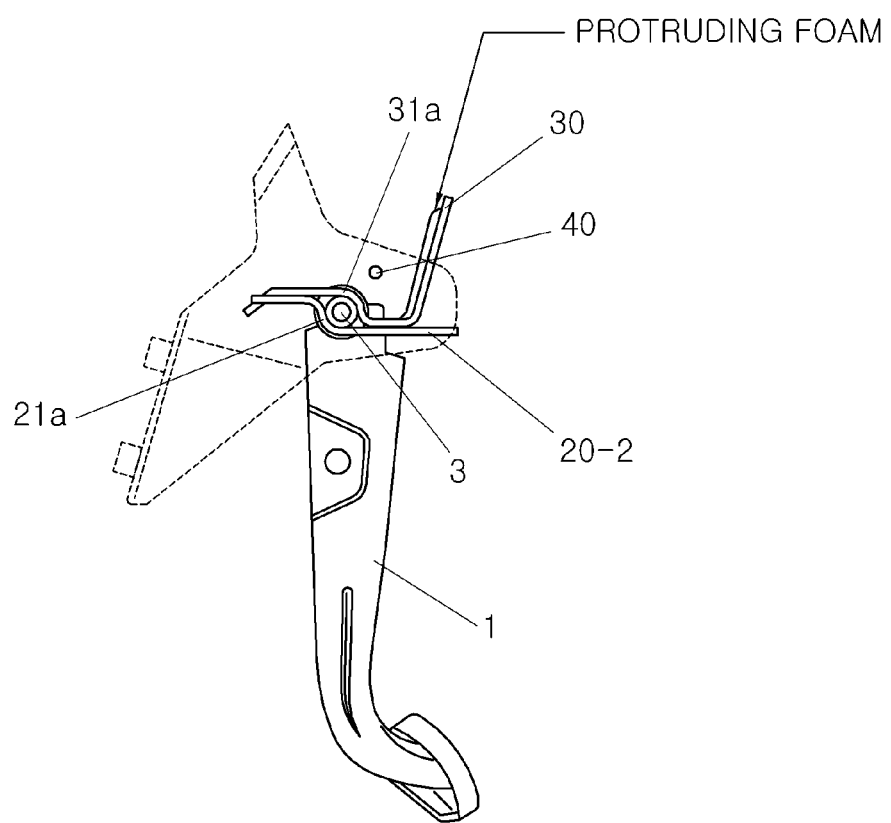
FIG. 3B is a view illustrating the first portion of an assembly coupled to a mounting bracket to form an assembled state of the driver's injury prevention type pedal according to an exemplary embodiment of the present invention.

FIGS. 2, 3A and 3B illustrate an assembly process of the pedal arm 1, the mounting bracket 10, the pair of the hinge supporters 20-1 and 20-2, the reverse rotation lever 30, and the reverse rotation support pin 40 according to an exemplary embodiment.

As shown in FIGS. 2, 3A and 3B, the first and second hinge supporters 20-1 and 20-2 may be assembled to the pedal arm coupling portion 10-1 of the mounting bracket 10 and the pedal arm hinge 3 is fitted to the pedal arm coupling portion 10-1 of the mounting bracket 10, so that the pedal arm 1 is coupled to the mounting bracket 10. In this case, the first and second sides of the pedal arm hinge 3 are pressed against the bent portions 21 of the first and second hinge supporters 20-1 and 20-2.

After the reverse rotation lever 30 is positioned at the pedal arm hinge 3, four riveting fixing portions a, b, c, and d may be formed by four first and second rivet protrusions 23 and 25 respectively formed on the first and second hinge supporters 20-1 and 20-2. In this case, the first and second sides of the pedal arm hinge 3 are pressed against the bent portions 31a of the reverse rotation lever 30.

As the four riveting fixing portions a, b, c, and d may be formed by the first and second hinge supporters 20-1 and 20-2 having a stepped structure using the bent portions 21 and the reverse rotation lever 30 having a stepped structure using the bent portions 31a, the reverse rotation lever 30 may be maintained to have higher strength in the assembled state. In particular, since the first and second sides of the pedal arm hinge 3 are pressed in the space defined between the bent portions 21 of the first and second hinge supporters 20-1 and 20-2 and the bent portions 31a of the reverse rotation lever 30, the pedal arm hinge 3 or the pedal arm 1 may be prevented from moving under any circumstances.

In an aspect of the present invention, the reverse rotation pin 40 may be coupled to the mounting bracket 10, above the reverse rotation lever 30. In this case, since the reverse rotation pin 40 is inserted and engaged into holes formed on the mounting bracket 10, the above assembly process may be more easily performed.

Figure 4:
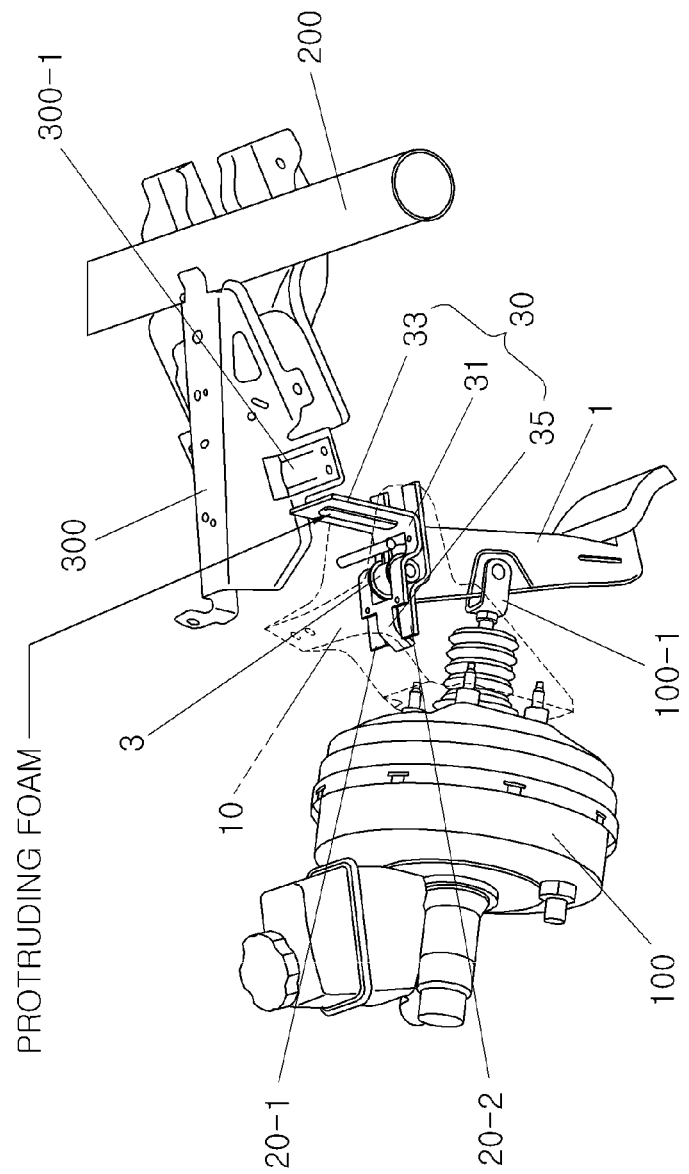
FIG. 4 is a view illustrating a state in which the driver's injury prevention type pedal is mounted to a vehicle according to an exemplary embodiment of the present invention.

FIG. 4 is a view illustrating a state in which the driver's injury prevention type pedal is mounted to a vehicle according an exemplary embodiment of the present invention. As shown in FIG. 4, the pedal arm 1 may be connected to a push rod 100-1 of a booster 100 in a state of being assembled to the mounting bracket 10 by the pedal arm hinge 3. In this case, when force by the reverse rotation lever 30 at the upper portion of the pedal arm 1 is applied to the push rod 100-1, the push rod 100-1 acts as a center of reverse rotation such that the lower portion of the pedal arm 1 is away from the driver.

In an aspect of the present invention, the mounting bracket 10 assembled to the pedal arm 1 may be located at a cowl mounting bracket 300 coupled to a cowl cross bar 200. In addition, the reverse rotation body 33 of the reverse rotation lever 30 coupled to the mounting bracket 10 may protrude outward of the mounting bracket 10 so as to be located in the vicinity of the cowl mounting bracket 300 at a predetermined interval. The reverse rotation body 33 and the cowl mounting bracket 300 may be maintained in a state of coming into contact with each other.

In particular, since a lever stopper 300-1 protrudes toward the reverse rotation lever 30, a distance between the cowl mounting bracket 300 and the reverse rotation body 33 may be optimized with respect to pushing by the collision.

FIGS. 5A, 5B, 6A and 6B are views illustrating a state in which injury of the driver's leg part is prevented by the driver's injury prevention type pedal according to an exemplary embodiment of the present invention.

Figure 5B:
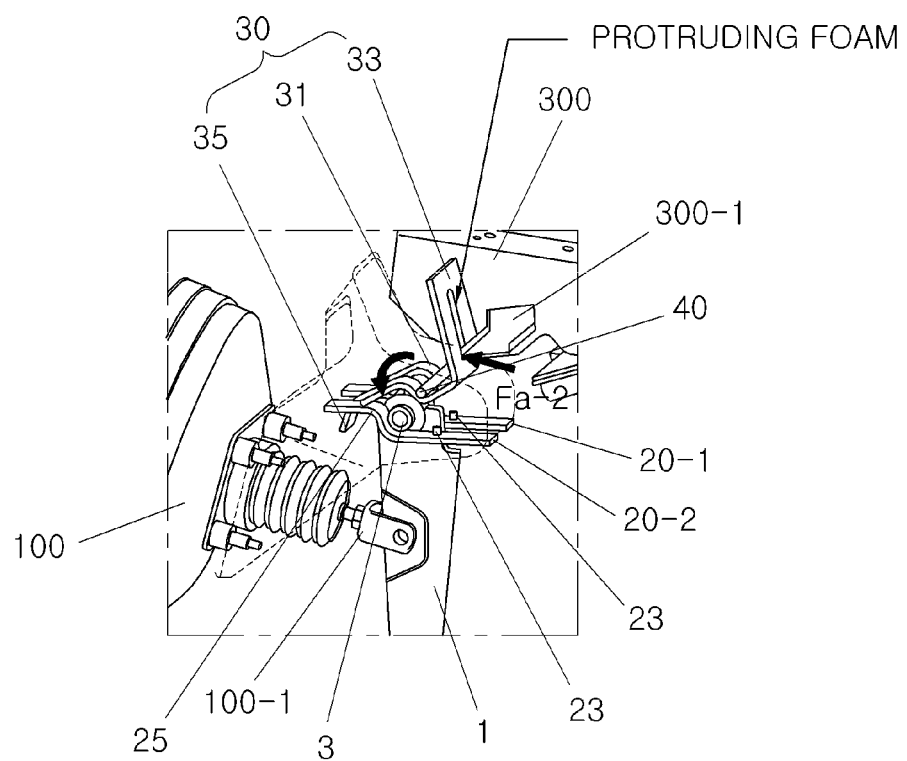
FIG. 5B is an exploded view illustrating a portion of the initial operation state of the driver's injury prevention type pedal for preventing injury to the driver's leg part according to an exemplary embodiment of the present invention.

FIGS. 5A and 5B show an initial state in which an impact is transferred to the pedal arm 1. The booster 100 is located toward the engine compartment and the dash panel 400 is interposed between the engine compartment and the vehicle interior. The pedal arm 1, the mounting bracket 10 assembled thereto, the first and second hinge supporters 20-1 and 20-2 coupled to the mounting bracket 10, the reverse rotation lever 30, and the reverse rotation support pin 40 are located toward the vehicle interior.

When the booster 100 is pushed toward the interior by the collision, the reverse rotation lever 30 is pushed toward the cowl mounting bracket 300 by impact force Fa applied by pushing of the booster 100. Consequently, the reverse rotation body 33 strikes the lever stopper 300-1, and thus it is converted into impact force Fa-1 by which the lever stopper 300-1 pushes the reverse rotation body 33.

When all of the four riveting fixing portions a, b, c, and d are broken on the reverse rotation lever 30 on which the impact force Fa-1 is applied to the reverse rotation body 33, the reverse rotation lever 30 loses resistance against the impact force Fa-1. In this state, since the reverse rotation body 33 receives impact force Fa-2 continuously applied thereto, torque begin to be generated in the reverse rotation lever 30. Thus, reverse rotation (counterclockwise direction) of the reverse rotation lever 30 is generated.

Figure 6A:
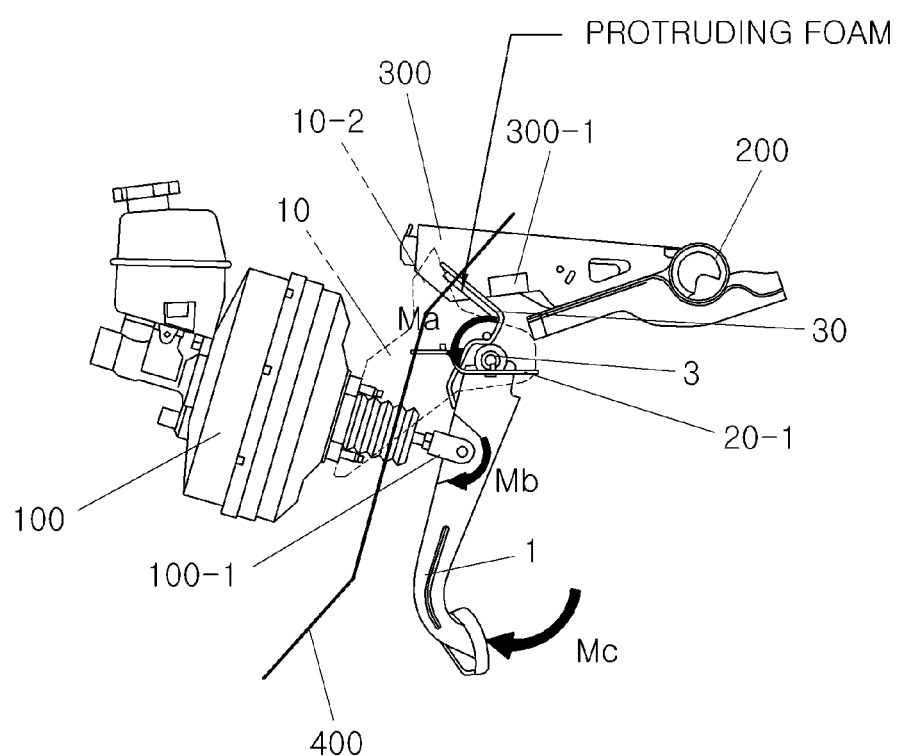
FIG. 6A is a view illustrating a state in which injury of the driver's leg part is prevented by the driver's injury prevention type pedal according to an exemplary embodiment of the present invention.
Figure 6B:
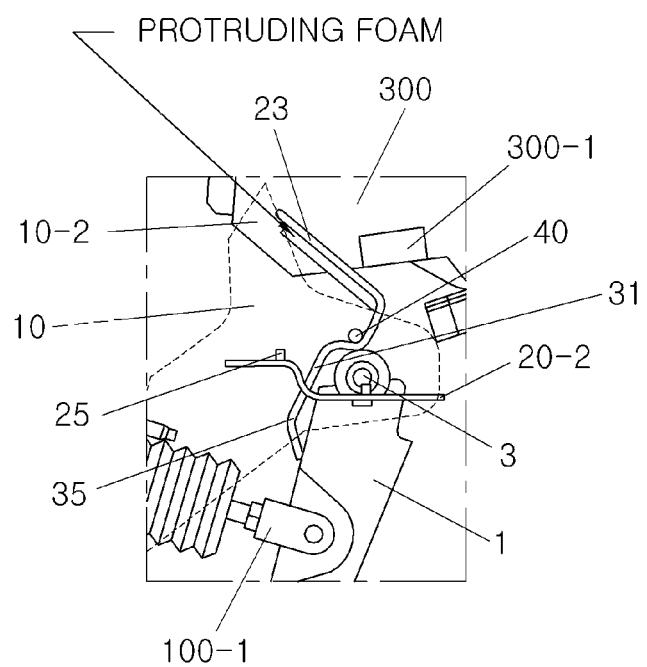
FIG. 6B is an exploded view illustrating a portion of a state in which injury of the driver's leg part is prevented by the driver's injury prevention type pedal according to an exemplary embodiment of the present invention.

FIGS. 6A and 6B show an operation state in which the pedal arm 1 is reversely rotated for the driver's injury prevention. When lever reverse rotation (counterclockwise direction) Ma of the reverse rotation lever 30 is generated, the position body 35 of the reverse rotation lever 30 is further pushed into the space defined by the first and second hinge supporters 20-1 and 20-2 so as to come into contact with the upper portion of the pedal arm 1.

In an aspect of the present invention, the pedal middle rotation (clockwise direction) Mb of the pedal arm 1 receiving force applied by the position body 35 of the reverse rotation lever 30 is generated around a pivot point of the booster rod 100-1. Such pedal middle rotation Mb is converted into pedal lower rotation (clockwise direction) Mc to rotate the lower portion of the pedal arm 1 in the same direction away from the driver's leg part, thereby preventing the driver's injury due to the pedal arm 1.

The driver's injury prevention type pedal includes the pedal arm 1 which may be coupled, at the upper portion thereof, to the pedal arm hinge 3 as a center of rotation of the pedal stroke, the mounting bracket 10 to which the upper portion of the pedal arm 1 may be fitted and coupled, and the reverse rotation lever 30 which presses the upper portion of the pedal arm 1 by counterclockwise direction rotation formed by pushing of the upper portion of the pedal arm 1, thereby leading to clockwise rotation of the lower portion of the pedal arm and preventing injury of the driver's leg part. In particular, since the driver's injury prevention type pedal is applicable to all sorts of pedals having the pedal arm hinge 3, the pedal may be converted into a brake pedal, a clutch pedal, or an acceleration pedal, thereby allowing pedal manufacturing costs to be significantly reduced.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driver's injury prevention type pedal comprising:
   a pedal arm which is rotatably coupled at an upper portion to a pedal arm hinge which acts as a center of rotation of a pedal stroke; and
   a universal reverse rotation member which reversibly rotates the pedal arm about the pedal arm hinge and towards a front of a vehicle, the universal reverse rotation member comprising:
      a mounting bracket to which the upper portion of the pedal arm is fitted and coupled,
      a reverse rotation lever which presses the upper portion of the pedal arm in a counterclockwise direction rotation when pushing the pedal arm,
      a first and a second hinge supporter arranged in the mounting bracket in a vertical direction and supporting first side and second side of the pedal arm hinge below the reverse rotation lever, and
      a reverse rotation support pin arranged in the mounting bracket in a horizontal direction above the reverse rotation lever,
      wherein the first and second hinge supporters include at least one riveting fixing protrusion protruded upward from the first and second hinge supporters to directly and fixedly couple with the reverse rotation lever.

2. The driver's injury prevention type pedal of claim 1, wherein a first bushing is coupled to the first side of the pedal arm hinge and a second bushing is coupled to the second side of the pedal arm hinge, respectively.

3. The driver's injury prevention type pedal of claim 1, wherein the pedal arm is fitted to a side of the mounting bracket in a width and length direction thereof, and a pedal arm coupling portion supporting both the first and the second side of the pedal arm hinge is formed on the side of the mounting bracket.

4. The driver's injury prevention type pedal of claim 3, wherein a lever covering portion protrudes from an upper side of the mounting bracket in the width and length direction thereof, and the lever covering portion is formed at a position where the lever covering portion deviates from a radius of rotation of the reverse rotation lever.

5. The driver's injury prevention type pedal of claim 1, wherein the reverse rotation lever comprises a seating body which has bent portions enclosing the first and second sides of the pedal arm hinge, a position body which presses the upper portion of the pedal arm in the counter clockwise direction rotation, and a reverse rotation body which receives force in a direction opposite to a pushing direction of the pedal arm such that the counterclockwise direction rotation of the position body is generated.

6. The driver's injury prevention type pedal of claim 5, wherein an overall length section of the seating body is formed into a step by the bent portions, and each of the bent portions is rounded to have the same diameter as an outer diameter of the pedal arm hinge.

7. The driver's injury prevention type pedal of claim 5, wherein:
   the reverse rotation body is bent and extends from a first side end of the seating body, and the position body is formed with a bending portion which is bent and extends from a second side end of the seating body; and
   a bent direction of the reverse rotation body is opposed to the bending direction of the position body.

8. The driver's injury prevention type pedal of claim 5, wherein the reverse rotation body is formed with foam protruding from a first side thereof to a second side thereof.

9. The driver's injury prevention type pedal of claim 1, wherein the first and second hinge supporters are respectively formed with bent portions enclosing the first and second sides of the pedal arm hinge, overall length sections of the first and second hinge supporters are respectively formed into a step by the bent portions, and each of the bent portions is rounded to have the same diameter as an outer diameter of the pedal arm hinge.

10. The driver's injury prevention type pedal of claim 1, wherein the at least one riveting fixing protrusion includes a first and a second protrusion protruded upward from the first hinge supporter and a third and a fourth protrusion protruded upward from the second hinge supporter wherein the first, second, third and fourth protrusions are coupled with the reverse rotation lever to form riveting fixing portions.

11. The driver's injury prevention type pedal of claim 1, wherein force for rotating the reverse rotation lever in the counterclockwise direction is applied by a cowl mounting bracket coupled to a cowl cross bar, and the pedal arm rotates about a push rod of a booster in a clockwise direction, opposite to the direction of rotation of the reverse rotation lever so that a lower portion of the pedal arm is rotated away from a driver.

12. The driver's injury prevention type pedal of claim 11, wherein the cowl mounting bracket is provided with a lever stopper directed toward the reverse rotation lever.

13. A driver's injury prevention type pedal comprising:
   a pedal arm which is coupled, at an upper portion thereof, to a pedal arm hinge as a center of rotation of a pedal stroke; and
   a universal reverse rotation member comprising:
      a mounting bracket fixedly coupled to a vehicle body in a state in which the upper portion of the pedal arm is fitted and coupled to the mounting bracket so as to support the pedal arm hinge;
      a first and a second hinge supporter which are vertically fixed to the mounting bracket and respectively formed with round-shaped bent portions enclosing left and right sides of the pedal arm hinge;

a reverse rotation lever which is formed with round-shaped bent portions enclosing the left and right sides of the pedal arm hinge and applies reverse rotation by pressing the upper portion of the pedal arm such that the pedal arm is away from a driver; and
a reverse rotation support pin which is horizontally fixed to the mounting bracket and reinforces horizontal strength of the mounting bracket,
wherein the first and second hinge supporters include at least one riveting fixing protrusion protruded upward from the first and second hinge supporters to directly and fixedly couple with the reverse rotation lever.

* * * * *